United States Patent [19]
Parker

[11] Patent Number: 4,661,548
[45] Date of Patent: Apr. 28, 1987

[54] CERAMIC TILE ADHESIVE WATER RESISTANT COMPOSITIONS BASED ON COPOLYMERS EMULSIONS

[75] Inventor: Robert G. Parker, Irchester, England

[73] Assignee: Scott Bader Company Limited, Wollaston, England

[21] Appl. No.: 800,111

[22] Filed: Nov. 20, 1985

[30] Foreign Application Priority Data

Nov. 20, 1984 [GB] United Kingdom ................. 8429320

[51] Int. Cl.$^4$ ............................ C08L 3/26; C08K 3/10
[52] U.S. Cl. .................................... 524/204; 523/334;
524/426; 524/427; 524/432; 524/434; 524/559
[58] Field of Search ............... 524/204, 432, 426, 427, 524/559, 434; 523/334

[56] References Cited

U.S. PATENT DOCUMENTS 3,931,085  1/1976  Drelich et al. ...................... 524/432
4,243,417  1/1981  Grourke et al. ..................... 524/432
4,250,082  2/1981  Sommer et al. ..................... 523/334
4,339,370  7/1982  Parker ................................. 524/424
4,407,997 10/1983  Sghibartz ............................ 524/413
4,517,330  5/1985  Zdanowski et al. ................ 524/413
4,520,156  5/1985  Grimm ................................ 524/432

FOREIGN PATENT DOCUMENTS 0023466  1/1969  Australia .
180673 10/1983  Japan .

Primary Examiner—Herbert J. Lilling
Attorney, Agent, or Firm—Cushman, Darby & Cushman

[57] ABSTRACT

An aqueous copolymer emulsion useful as a ceramic tile adhesive contains filler material, a zinc compound and an aqueous emulsion of a copolymer containing residues of an unsaturated aliphatic hydrocarbon monomer, an unsaturated monomer copolymerizable therewith and a small amount of residues containing carboxyl groups.

10 Claims, No Drawings

CERAMIC TILE ADHESIVE WATER RESISTANT COMPOSITIONS BASED ON COPOLYMERS EMULSIONS

BACKGROUND OF THE INVENTION

There are many applications where water based systems would be cheaper than, and safer to use, than materials currently employed based on organic solvents. Much work has been done in this field and one such development is described in EP-B-No. 0035353 (U.S. Pat. No. 4,339,370) which is directed mainly towards ceramic tile adhesives.

That prior art specification discloses the use of an emulsion copolymer made from at least one vinyl aromatic monomer, at least one (meth) acrylate ester and a minor percentage of an unsaturated organic acid combined with zinc ammonium carbonate and large amounts of inorganic fillers.

Whilst such compositions give ceramic tile adhesives with excellent properties they are more expensive than other copolymer emulsions especially when compositions are required which have some flexibility.

Monomers that are low in cost include vinyl acetate, butadiene and ethylene but not all these give copolymers with the desired properties. For example copolymer emulsions made from vinyl acetate and a minor amount of acrylic acid are unstable in the presence of zinc ammonium carbonate and are difficult to compound into storage-stable form.

Emulsions of the type claimed in EP-B-No. 0035353 can be made more flexible by the incorporation of higher (meth) acrylate esters but this increases the cost.

SUMMARY OF THE INVENTION

We have now found that emulsions of copolymers containing unsaturated aliphatic hydrocarbon residues derived from, for example, butadiene or ethylene and residues derived from comonomers copolymerizable therewith such as styrene or vinyl acetate (e.g. butadiene/styrene, ethylene/vinyl acetate and ethylene/vinyl chloride copolymers) which copolymers also include a small proportion of unsaturated organic carboxylic acid among the monomers used can be compounded with a filler and a zinc compound to give excellent adhesives with good shelf life, good flexibility, good water resistance and good retention of adhesive power in the presence of moisture. The zinc compound is preferably one which can be incorporated in the composition as an aqueous solution, for example, zinc ammonium carbonate or similar material.

The invention provides an aqueous copolymer emulsion composition containing at least one filler, a zinc compound and an aqueous emulsion of a copolymer containing residues derived from at least one unsaturated aliphatic hydrocarbon monomer and at least one unsaturated monomer copolymerizable therewith, and a small amount of residues containing carboxyl groups.

The small amount of unsaturated carboxylic acid monomer may be up to about 5% by weight of total monomers in the copolymer and the unsaturated carboxylic acid monomer may be, for example, acrylic acid, methacrylic acid, itaconic acid, maleic acid or fumaric acid. The flexibility of the films obtained from the emulsions will depend on the proportions of the monomers used, e.g. in a butadiene/styrene emulsion the higher the styrene content the lower the flexibility. The comonomer copolymerizable with the unsaturated hydrocarbon monomer such as styrene, may be present in an amount of from 25-85% by weight of the comonomer mixture.

Minor amounts of other monomers such as acrylonitrile may be included in the copolymer. These emulsions may also be mixed with the acid containing vinyl aromatic/(meth) acrylate copolymer emulsions described in EP-B-No. 0035353. The copolymer emulsions are compounded with fillers such as China clay, natural or precipitated calcium carbonates, silica, dolomite and alumina hydrate so that the final composition preferably contains 20-90% by weight of the total weight of the composition of filler.

Copolymer emulsions useful in compositions of the invention are available commercially. For example, suitable butadiene/styrene copolymer emulsions containing small amounts of unsaturated carboxylic acid monomer are Polysar resins, e.g. Polysar PL 208 and Doverstrand "Revinex" latices, e.g. Revinex 20 N 40, 43 P 43 and 96 C 40.

Zinc ammonium carbonate or similar compound may be incorporated as a solution containing about 8-10% by weight of zinc oxide and may be present in the adhesive at levels between 5 and 20 parts per hundred by weight based on wet emulsion. This amount will depend on the amount of acidic monomer in the copolymer emulsion.

The adhesives may contain minor amounts of surfactants, antifoams, preservatives, plasticisers and pigments.

Preferred embodiments of the invention will now be described in more detail with reference to the following Examples.

DESCRIPTION OF PREFERRED EMBODIMENTS

Example 1 (Best Method)

A ceramic tile adhesive was made up from the following ingredients.

A styrene/butadiene resin latex containing 42% styrene, about 53-57% butadiene and about 1-5% of an unsaturated monomer providing carboxylic acid groups: 150.0 pbw Solution of zinc ammonium carbonate (9.6% by wt. ZnO): 15.0 pbw These were stirred together.

Natrosol$^R$ 250HR (a thickener) in an amount of 3.0 pbw was stirred in water (167 pbw), a few drops of ammonia was added and stirring was continued until the viscosity increasBSed.

To the styrene/butadiene resin and zinc ammonium carbonate were then added with stirring:

Foamaster$^R$ 44 (antifoam): 1.0 pbw

Densil$^R$ P (fungicide): 2.0 pbw di-n-butyl phthalate (plasticiser and coalescing agent): 2.0 pbw 20% Calgon$^R$ solution (dispersant): 1.0 pbw Dispex$^R$ G.40 (dispersant): 1.5 pbw After stirring for 2 minutes 375 pbw of each of silicas XPF2 and XPF3 (British Industrial Sands) were added and stirring continued until a good dispersion was obtained. The resulting ceramic tile adhesive was tested to B.S. 5980 when a result of 9.2 kN in shear was obtained on the Class AA water test which is well above the minimum value of 4.5 kN.

Example 2

A mixture similar to Example 1 was made up except that the silica was replaced by limestone to give a pigment binder ratio of 3:1.

This formulation was more flexible than that of Example 1 and passed the Flexibility in Performance Test for Organic Adhesives CTI-64-2 of Ceramic Tile Institute, California.

Example 3

A mixture similar to Example 1 was made up except that 10 pbw of zinc ammonium glycinate (8.5% by weight ZnO) was used instead of zinc ammonium carbonate and limestone was used as the filler instead of the silicas at a pigment binder ratio of 20:1.

On testing a result of 4.5 kN in shear was obtained on the Class AA water test of BS 5980.

Example 4

A mixture similar to Example 1 was made up except that the resin latex used was commercially available Doverstrand "Revinex" Latex 20 N 40, a latex of a styrene/butadiene copolymer containing a small amount of carboxylic acid containing residues, and limestone was used as the filler at a pigment binder ratio of 20:1. The shear test on the Class AA water test of BS 5980 gave a result of 6.3 kN.

Example 5

A mixture similar to Example 2 was made up except that the resin latex was Revinex 43 P 43, a latex of a copolymer containing 28% butadiene, about 67-71% styrene and about 1-5% carboxylic acid containing residues. The shear test on the Class AA water test of BS 5980 gave a result of 10.3 kN.

Example 6

A mixture similar to Example 2 was made up except that the resin latex was Revinex 96 C 40, a latex of a copolymer containing 63% butadiene, about 32-36% styrene and about 1-5% carboxylic acid containing residues. The shear test on the Class AA water test of BS 5980 gave a result of 7.1 kN.

Similar results are obtained using other latices of ethylene/vinyl acetate and ethylene/vinyl chloride copolymers and other styrene/butadiene copolymer latices.

I claim:

1. A ceramic tile adhesive composition containing from 20 to 90% by weight of the total weight of the composition of at least one filler, a zinc compound and an aqueous emulsion of a copolymer containing units derived from (i) at least one unsaturated aliphatic hydrocarbon monomer, (ii) at least one unsaturated monomer copolymerizable therewith, and (iii) an effective amount up to 5% of an unsaturated monomer containing carboxylic acid groups and copolymerizable with each of the monomers (i) and (ii).

2. An aqueous copolymer emulsion composition according to claim 1, wherein, in the said copolymer, the aliphatic hydrocarbon monomer units are selected from ethylene and butadiene.

3. An aqueous copolymer composition according to claim 1, wherein, in the said copolymer, the units of unsaturated monomer copolymerizable with the aliphatic hydrocarbon monomer are selected from styrene and vinyl acetate.

4. An aqueous copolymer composition according to claim 1, wherein, in the said copolymer, the residues containing carboxyl groups are derived from an unsaturated organic acid monomer selected from acrylic, methacrylic, itaconic, maleic and fumaric acids.

5. An aqueous copolymer composition according to claim 1, wherein, in the copolymer, the units are derived from at least butadiene, styrene and an unsaturated organic acid monomer.

6. An aqueous copolymer composition according to claim 1, wherein, in the copolymer, the said units are derived from at least ethylene, vinyl acetate and an unsaturated organic acid monomer.

7. An aqueous copolymer composition according to claim 1, wherein the zinc compound is incorporated into the composition as an aqueous solution.

8. An aqueous copolymer composition according to claim 1, wherein the zinc compound is selected from compounds capable of formation by reaction of zinc oxide to provide a water soluble said zinc compound therefrom.

9. An aqueous copolymer composition according to claim 8, wherein the zinc compound is selected from zinc ammonium carbonate and zinc ammonium glycinate.

10. An aqueous copolymer composition according to claim 1, wherein, in the said copolymer, the residues containing carboxyl groups are derived from an unsaturated organic carboxylic acid monomer present in an amount of up to 5% by weight of the weight of monomers in the copolymer.

* * * * *